M. R. IRRGANG.
BEER AND HOP SEPARATOR.
APPLICATION FILED NOV. 13, 1913.
1,106,450.
Patented Aug. 11, 1914.
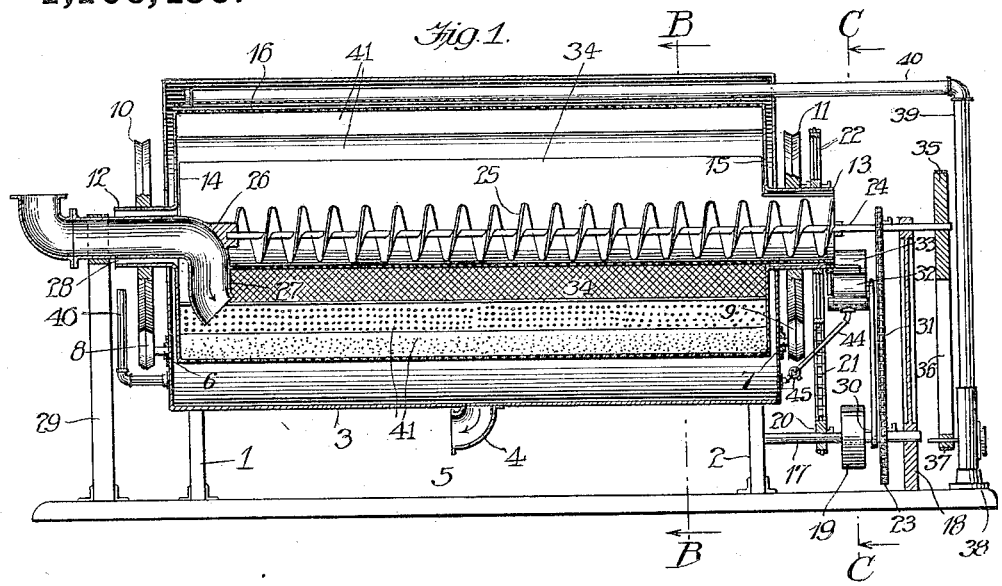
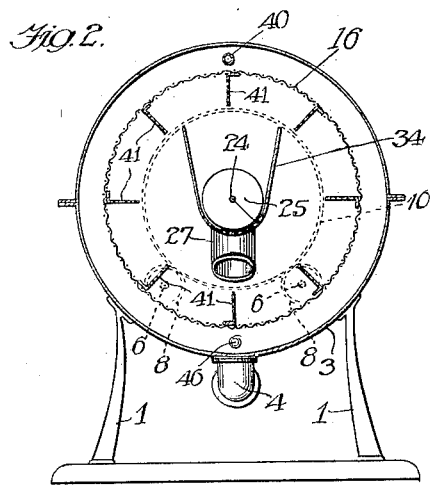
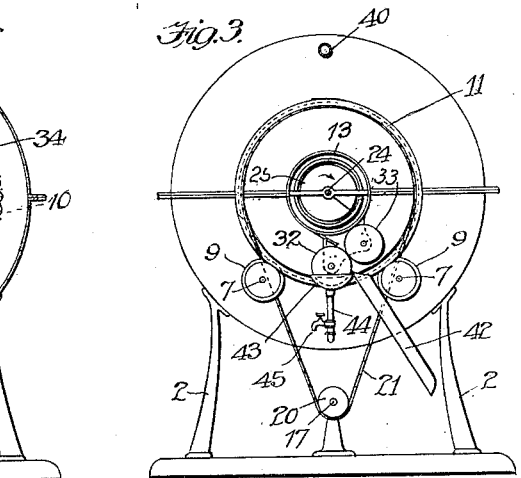
Witnesses
Martin H. Olsen
William E. Hann
Inventor
Max Richard Irrgang,
By Kummler & Kummler,
Attys.

UNITED STATES PATENT OFFICE.

MAX RICHARD IRREGANG, OF CHICAGO, ILLINOIS.

BEER AND HOP SEPARATOR.

1,106,450.  Specification of Letters Patent.  Patented Aug. 11, 1914.

Application filed November 13, 1913. Serial No. 800,822.

*To all whom it may concern:*

Be it known that I, MAX RICHARD IRREGANG, a citizen of the United States of America, and a resident of Chicago, county of Cook, and State of Illinois, have invented certain new and useful Improvements in Beer and Hop Separators, of which the following is a specification.

The objects of this invention are to provide improvements in separators adapted for use in separating hops or the like from beer, and in compressing the hops for the purpose of removing all liquid therefrom and returning more or less of the liquid to the beer and by this means, to some extent control the flavor of the beer.

A further object of the invention is to provide an improved apparatus adapted to speedily remove the liquid from the hops so that the latter may be burned with little, if any, preliminary drying.

An illustrative embodiment of the above invention is shown in the accompanying drawings, in which,—Figure 1 is a longitudinal sectional view of a separator constructed according to this invention. Fig. 2 is a transverse section taken on the line B—B of Fig. 1. Fig. 3 is a sectional view taken on the line C—C of Fig. 1.

In general, the apparatus comprises a brass wire screen or perforated drum for receiving the beer and hops to be separated, this drum being provided with perforated blades on its interior surface adapted to lift hops from the beer in the bottom of the drum and deposit the hops into a spiral conveyer, which in turn delivers the hops to a pair of crushing rollers adapted to extract the remaining liquid from the hops and return any desired quantity of said liquid to the beer which has been separated from the hops. The cylindrical screen is surrounded by an unperforated cylindrical vat from which the separated beer may be drawn after passing through the separating screen into said vat. The apparatus includes a pneumatic means whereby fine jets of air are caused to pass through the upper portion of the screen for the purpose of removing the adhering hop leaves and causing them to drop into the spiral conveyer.

Referring to the drawings, the supporting frames 1 and 2 support a non-rotating cylindrical receptacle 3, which receives the separated beer. This receptacle is provided with an outlet 4, having a suitable valve 5 to permit the separated beer to be drawn therefrom as desired.

The receptacle 3 carries two pairs of stub shafts 6 and 7 on which are journaled rollers 8 and 9 in engagement with grooved wheels 10 and 11 fast to annular flanges 12 and 13 integral with the end pieces 14 and 15 of a cylindrical brass separating screen 16. In this manner, the separating screen is rotatably mounted in the receptacle 3 which receives the separated beer, while the bearings are so arranged that there is little, if any, possibility of lubricant from bearings working its way into the beer. The screen 16 is rotated by a drive shaft 17 journaled in frames 2 and 18 and receiving power by a belt through the pulley 19 which it carries. Shaft 17 also carries a sprocket wheel 20 connected by a chain 21 with a sprocket wheel 22 fast to flange 13. Drive shaft 17 through a chain and sprocket connection 23 drives the shaft 24 of a spiral conveyer 25 extending axially through the separator and journaled at one end in frame 18 and at its other end in a bearing 26 integral with an inlet pipe 27 passing through the open end 28 of the separator and supported in frame 29. Shaft 17 also carries a sprocket 30 connected by a chain 31 with one of a pair of crushing rollers 32 and 33 preferably covered with vulcanite and located at the discharge end of a perforated trough 34 through which the conveyer 25 drives the separated hops.

The conveyer shaft 24 carries fast at its free end a pulley 35 connected by a belt 36 with a pulley 37 fast to the shaft of a blower or fan 38. The outlet of the blower 38 comprises a vertical pipe 39 communicating with a perforated pipe 40 extending along the entire length of the separating screen 16 between it and the surrounding receptacle 3 above the conveyer 25. The interior of the separator 16 is provided with a plurality of perforated longitudinal flanges 41 adapted upon rotation of the separator to lift hops out of the beer in the bottom of the separator and deposit the same in the trough 34 of the conveyer. The perforations in the flanges permit beer to drain therefrom without carrying with it the hops before the latter are in position to be deposited in the conveyer. Air discharged from the perforated pipe 40 removes hops adhering to the interior of screen 16 and the surface of flanges 41, blowing them downwardly into the conveyer trough.

A suitable discharge chute 42 is supported in position to receive the hops after the latter have passed between rollers 32 and 33. The liquid compressed from these rollers pours into a trough 43 below rollers 32 and from this trough passes through the pipe 44 into the receptacle 3. A two way valve 45 is provided in pipe 44 so that any part of the liquid removed from the hops by rollers 32 and 33 may be prevented from returning to receptacle 3.

In Fig. 1, a gage 46 is shown arranged to disclose the height of the beer in the receptacle 3 and separator 16.

In operation, the beer and hops to be separated enter the device through pipe 27, and the beer passes through screen 16 into receptacle 3. Rotation of screen 16 carries the hops which have settled in the bottom of the screen upwardly, depositing them into the conveyer 25. As the screen rotates past perforated pipe 40, it is cleared of adhering hops by the jets of air from this pipe passing through the screen. The conveyer 25 discharges the separated hops on the rollers 32 and 33 which are continually rotating toward each other at their upper sides and thereby compress the hops, removing liquid therefrom which is delivered into trough 43, while the hops are discharged through chute 42. Part or all of the liquid compressed from the hops passes from pipe 44 into receptacle 3. By delivering more or less of the juices compressed from the hops, the flavor of the beer may in this manner be much under the control of the operator and require less boiling of the beer and hops previous to their separation.

Although but one specific embodiment of this invention has been herein shown and described, it will be understood that numerous details of the construction shown may be altered or omitted without departing from the spirit of this invention as defined by the following claims.

I claim:

1. In a device of the class described, the combination with a filtering device comprising a rotary screen having perforated blades for removing semi-solid matter from the bottom of said screen, and a receptacle for collecting filtered liquid, of a conveyer for removing semi-solid matter from said filtering device, means for expressing liquid from said semi-solid matter, and a connection between said means and receptacle for delivering to said receptacle liquid expressed from said semi-solid matter, said connection including a two way valve whereby any desired portion of the liquid passing through said connection may be prevented from entering said receptacle.

2. In a device of the class described, the combination with a filtering device comprising a rotary screen having perforated blades for removing semi-solid matter from the bottom of said screen, and a device for expressing juices from said semi-solid matter and returning the juices to the filtering device.

Signed at Chicago this 7th day of November 1913.

MAX RICHARD IRREGANG.

Witnesses:
  EUGENE A. RUMMLER,
  M. IRENE HUTCHINGS.

---

Copies of this patent may be obtained for five cents each, by addressing the "Commissioner of Patents, Washington, D. C."